United States Patent [19]

Fullerton

[11] 4,373,926
[45] Feb. 15, 1983

[54] AUTOMATIC TRANSMISSION HAVING A CONTINUOUSLY VARIABLE DRIVE RATIO

[76] Inventor: Robert L. Fullerton, P.O. Box 4119, Incline Village, Nev. 89450

[21] Appl. No.: 170,529

[22] Filed: Jul. 21, 1980

[51] Int. Cl.³ .............................................. F16H 55/54
[52] U.S. Cl. ......................................... 474/57; 474/56
[58] Field of Search ................... 474/50, 52, 53, 56, 474/57

[56] References Cited

U.S. PATENT DOCUMENTS

| | | | |
|---|---|---|---|
| 616,630 | 12/1898 | Pratt | 474/50 |
| 698,854 | 4/1902 | Pratt | 474/53 |
| 1,496,032 | 6/1924 | Sleeper | 474/50 |
| 2,584,447 | 2/1952 | Hayot | 474/57 |
| 3,956,944 | 5/1976 | Tompkins | 474/50 |
| 3,969,948 | 7/1976 | Pipenhagen | 474/50 |
| 3,995,508 | 12/1976 | Newell | 474/50 |
| 4,068,539 | 1/1978 | Nye | 474/53 |

FOREIGN PATENT DOCUMENTS

| | | | |
|---|---|---|---|
| 55912 | 2/1935 | Norway | 474/57 |
| 174415 | 1/1935 | Switzerland | 474/57 |

*Primary Examiner*—Lawrence J. Staab
*Attorney, Agent, or Firm*—David A. Boone

[57] ABSTRACT

An automatic transmission comprises a first rotating assembly coupled via a bias member to a second rotating assembly. The second rotating assembly varies its effective diameter in response to the torque applied to the transmission. The bias member, e.g., a spring, holds the first and second rotating assemblies in a first relative position. However, as the applied torque increases the bias tension is overcome and relative rotation of the first and second assemblies occurs towards a second relative position; and simultaneously, the effective diameter of the second rotating assembly decreases.

2 Claims, 35 Drawing Figures

Fig. 14A REST

Fig. 14B MEDIUM

Fig. 14C MAXIMUM

AUTOMATIC TRANSMISSION HAVING A CONTINUOUSLY VARIABLE DRIVE RATIO

BACKGROUND AND SUMMARY

Transmissions are commonly used to couple driving sources such as motors and the like to the drive train of a system or to the wheels of an automobile or bicycle. Transmissions accomplish a gearing up or a gearing down between the drive source and the driven member by varying the relative rotation between the driving member and the driven member through a series of ratios or "gears," the ratio being varied stepwise or continuously over some predetermined range.

Various previous attempts at automatic transmissions have involved very complex arrangements of torque converters, gears, etc. which caused the transmission to shift between a few preselected drive ratios at predetermined points. Typically, these points are at clearly defined occurrences, e.g., specific rotational speeds of the driving or driven member.

Chain drive systems are particularly useful in light duty applications such as bicycles and motorcycles. Potentially, they would also be particularly adaptable to small cars, particularly ones employing front wheel drive and having a transversely mounted engine. However, both manual and automatic shifting transmissions available for chain drive systems have been a major drawback or totally unacceptable in applications.

Some chain drive transmission mechanisms have used sprocket wheels of graduated dimensions together with a deraileur system to shift the chain from one sprocket wheel to the next. These systems are typically not reliable, require precise and frequent adjustment, do not shift well under a heavy load and the missing of a sprocket wheel during a shift results in a catastrophic failure of the system, e.g., the chain falling between the sprocket wheels and jumping the mechanism.

Therefore, while chain drive mechanisms are commonly in use, the aforesaid disadvantages of chain drive mechanisms have limited their use primarily to those applications where a variable ratio transmission is not necessary; where the deraileur shifting system is acceptable, e.g., such as bicycles; or where a conventional transmission is inserted elsewhere in the system. An example of the latter is those bicycles or motorcycles wherein a transmission is placed within the hub of the driven wheel and manually controlled from the handlebars.

Note that while the above solutions have been adequate in their applications, there has been up to this time no simple and dependable chain drive automatic transmissions which were continuously variable over a range of drive ratios and which provided automatic variation of the drive ratio in response to the torque applied to the system.

SUMMARY OF THE INVENTION

In accordance with the preferred embodiment of the present invention, drive torque is applied to a first rotating assembly. This first rotating assembly is coupled via a bias member to a second rotating assembly. The second rotating assembly varies its effective diameter in response to the torque applied to the transmission. In the preferred embodiment, the first and second rotating assemblies have the same rotational axis but can rotate relative to one another over a predetermined range. The bias member, e.g., a spring, holds the first and second rotating assemblies in a first relative position. However, as the applied torque increases the bias tension is overcome and relative rotation of the first and second assemblies occurs towards a second relative position; and simultaneously, the effective diameter of the second rotating assembly decreases. This decreasing of the second rotating assembly in diameter automatically and gradually shifts the transmission into a lower gear ratio. An idler gear may be part of the system to take up and provide chain slack as required over the shifting range. However, in one embodiment no idler gear is required. In this embodiment two transmissions are used. One is placed at the driving source and the other is placed at the driven member. For example, in a bicycle, one transmission would be at the pedal crank, and the other one would be at the rear wheel. In the transmission at the pedal crank, the sprocket wheel would be biased open to its largest diameter while in the transmission assembly at the rear wheel, the sprocket assembly would be biased at its smallest diameter. The transmission at the pedal crank would work as above mentioned. However, the transmission at the rear wheel assembly would operate in exactly the reverse fashion. As increasing torque was applied to the rear wheel the sprocket wheel would increase in diameter. Therefore, in low gear the bias tension in both the front sprocket wheel at the rear wheel would be overcome. In the front transmission, the sprocket wheel would be at its smallest diameter and in the rear transmission the sprocket wheel would be forced open to its largest diameter. This would be the low gear for the bicycle. As one attained some speed and less work was required to maintain the bicycle at the desired speed, the sprocket wheel in the front of the bicycle would be allowed to expand towards its full open or maximum diameter as less torque was applied to it. Similarly, the rear sprocket wheel would contract to its smallest diameter as the torque applied decreased. This latter condition would be the high gear for the bicycle. The appropriate selection of both the sprocket wheel minimum and maximum diameters and the appropriate bias members to accommodate the load range expected will result in a continuously variable automatic transmission. The lowest and highest gear combinations possible will be determined for each individual case by the ratio of the minimum and maximum diameters of the front and back sprocket wheels. Floater bearings are alternated in the sprocket wheel assembly with the load bearing sprocket wheels. These floaters insure that, as the sprocket wheel diameter rapidly contracts, the slack will be taken up in a smooth fashion.

DESCRIPTION OF THE PREFERRED EMBODIMENT

Figure 1:
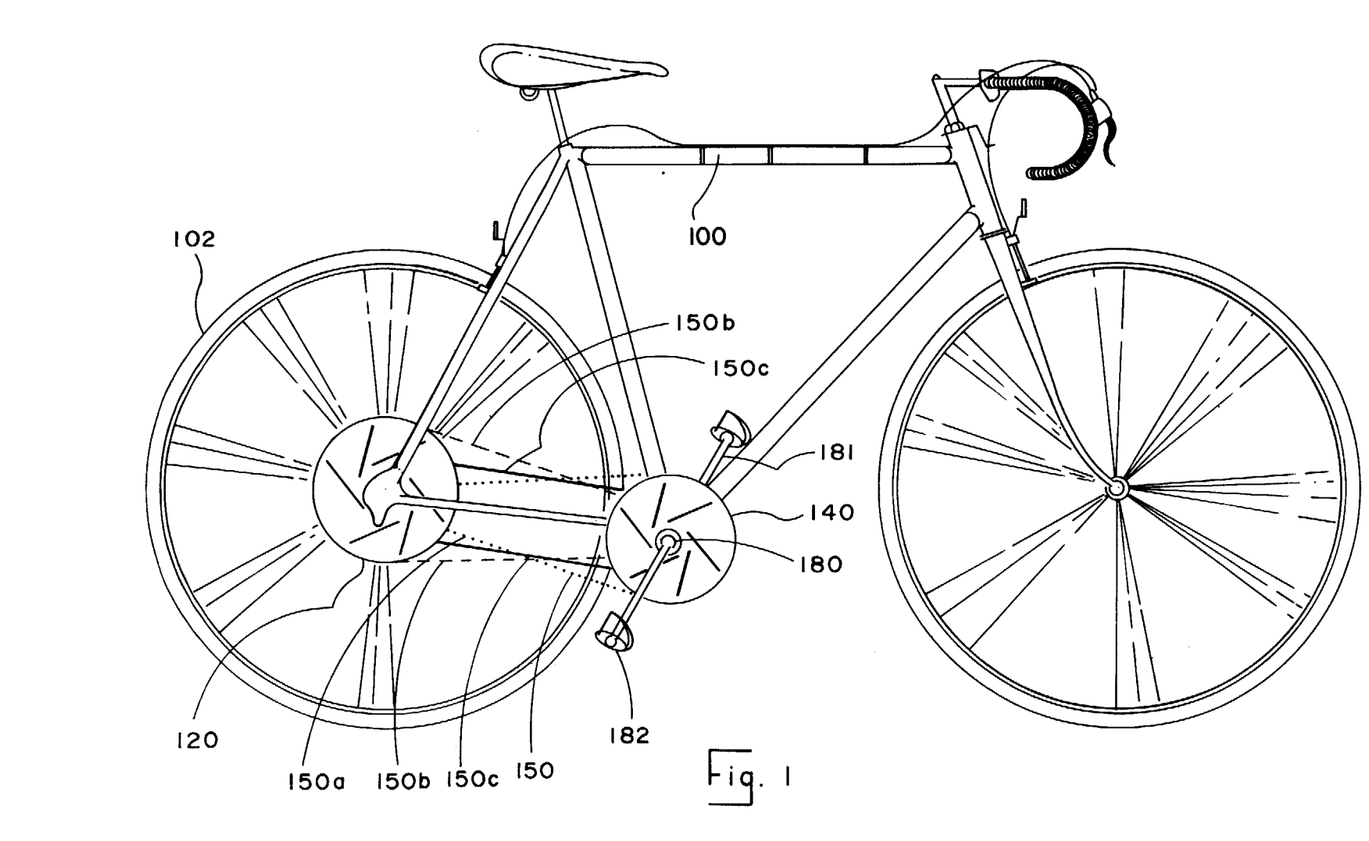
FIG. 1 illustrates a bicycle having dual transmissions in accordance with one embodiment of the present invention.

Referring now to FIG. 1, there is shown a bicycle 100 utilizing dual transmissions 120 and 140 in accordance with the preferred embodiment. These two transmission cooperate together to continuously vary the ratio of the number of turns of the pedal crank 180 with respect to the rotation of the rear wheel 102. Pedal crank 180 is directly coupled to pedals 181 and 182. Pedal crank 180 is also directly coupled to the outer or primary discs of transmission 140.

A chain 150 passes through sprocket wheel assemblies in both transmission 140 and transmission 120. These sprocket wheel assemblies in transmission 140 and 120 vary in diameter in response to the applied torque or torque reaction force applied thereto.

The front transmission 140 sprocket assembly is biased to its maximum effective diameter. Conversely the sprocket wheel assembly within transmission 120 is biased in the smallest effective diameter of its range of diameters possible. Thus, when the bicycle is at rest and no torque is being applied to the pedal crank through pedals 181 and 182, the bicycle is automatically in high gear, i.e., the maximum turning of the rear wheel occurs for each turn of the pedal crank.

Also in FIG. 1, there are shown two other possible positions of the chain when the transmission is in use. When the chain is in the position as shown by the dotted line 150A, it is in the high gear as described above. This is the normal position when the bicycle is at rest or when the minimum torque is being applied to the pedal crank. When the bicycle is accelerating, climbing an incline or any other activity where a large torque is applied to the pedal crank, the bias tension of the sprocket wheel assemblies in both transmission 140 and 120 will be overcome. The operation of these assemblies is described more fully below but for this preliminary explanation it is sufficient to say that the biased tension is overcome and the sprocket assembly in transmission 140 is reduced towards its smallest diameter and the sprocket assembly in transmission 120 is expanded towards its largest operating diameter. As this occurs, the transmissions have automatically and continuously shifted the bicycle into low gear and the chain substantially assumes the position shown by line 150B. Furthermore, between these two aforementioned stages, the transmission passes through various intermediate gear ratios such as the one indicated by line 150C.

It should be noted that since a contraction of the front sprocket wheel assembly diameter is accompanied by a corresponding expansion of the rear sprocket wheel effective diameter; and likewise a contraction of the rear transmission sprocket wheel diameter is accompanied by a corresponding increase in the sprocket assembly diameter of the front transmission assembly 140, the chain travel path is always substantially of the same length and hence no idlers or other mechanisms to accommodate chain slack are necessary. This is true when two transmissions of opposing and substantially equal bias tension are employed, as in this embodiment of the present invention.

Figure 2:
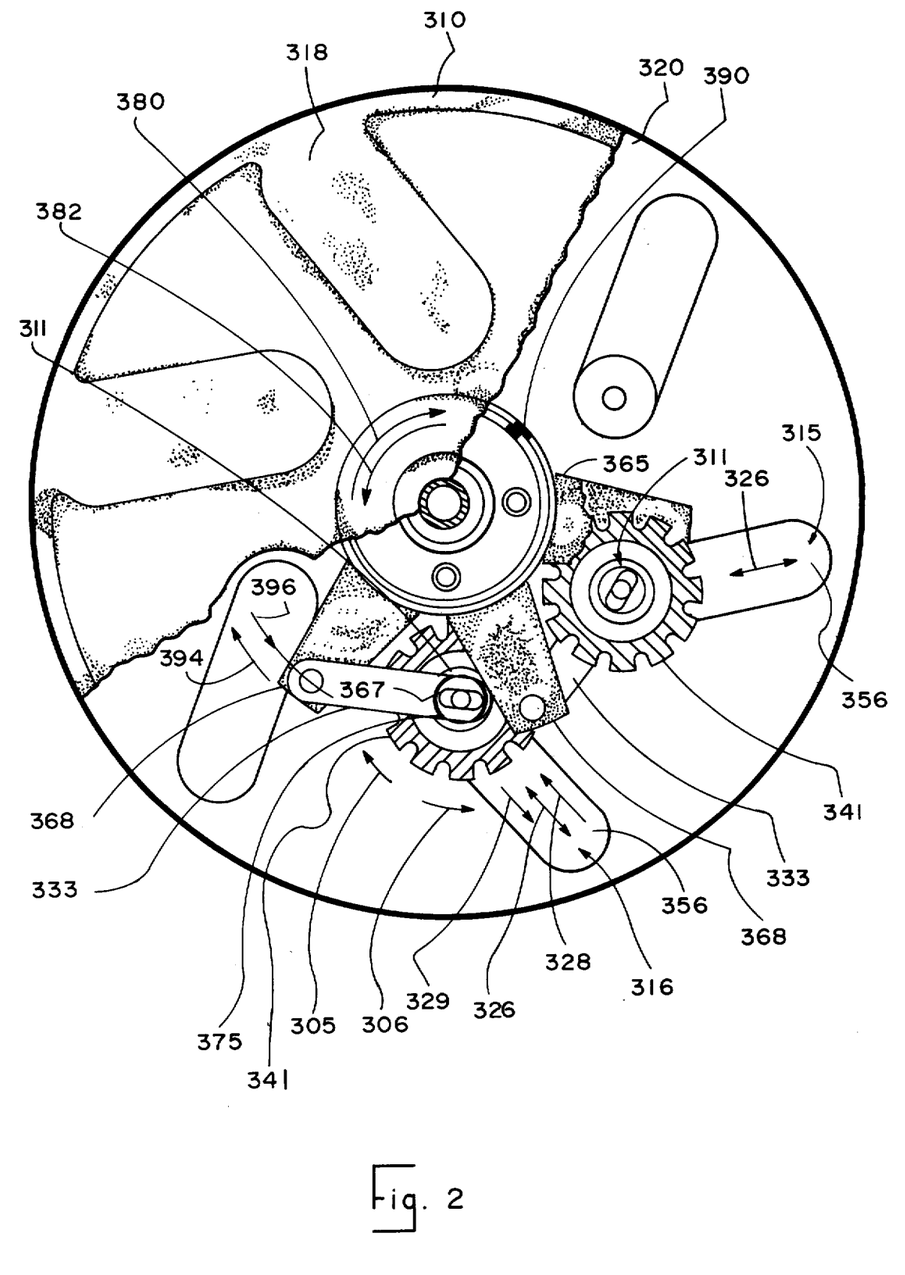
FIG. 2 illustrates a perspective cutaway view of a first embodiment of the present invention.

Referring now to FIG. 2, there is shown a cutaway view of a transmission assembly in accordance with the preferred embodiment. Note that inner and outer plates 310 and 320 consist of mating assemblies which have corresponding recessed grooves such as 315 and 316 on their inside portion. While the positioning of these grooves is shown by the relief portion on the outside of the discs such as relief portion 318, these grooves do not extend through the plate.

These grooves or channels such as channels 315 and 316 are deep enough to receive the roller bearings of the sprocket wheel assembly 341. These channels are slightly oversized so that bushings 311 moves easily up and down the channels as indicated by arrow 326 similar to a cam follower action as they are driven via arms 333 which are coupled to projections 368 of of star wheel assembly 365.

It should be noted that some of the members utilized in the preferred embodiment are not shown in FIG. 2 for clarity purposes. For example, in the preferred embodiment, the roller bearings are held in place and driven by upper and lower star wheel projections 368 and arms 333. In this way equal force is applied to each side of the roller bearings of the sprocket wheel assemblies and hence there is no twisting action which might tend to jam them within the channel. This dual assembly is clearly seen in the cross-sectional view of FIG. 4 which is described below.

Still referring to FIG. 2, it should be noted that the alternating roller bearing sprocket assemblies such as assembly 341 have roller clutch assemblies such as roller clutch assembly 375. These roller clutch assemblies only allow rotation of the sprocket assembly in one direction. In the preferred embodiment these sprocket assemblies use roller clutches similar to the Torrington Roller Clutch No. RC-040708 or the like. In contrast to these assemblies which use the roller clutch assemblies, each other alternate roller bearing is completely freewheeling and rotates in either direction. This alternating of sprocket assemblies having roller clutches and those which are free-wheeling in both directions is done in the preferred embodiment to minimize chain hang-ups, situations where the chain might jump off the sprocket wheel assemblies, but for the free-wheeling sprocket assemblies which remain in firm engagement with the chain even during the rapid expansion and contraction of the sprocket wheel assembly during those times when the applied torque is rapidly varying.

Figure 3A:
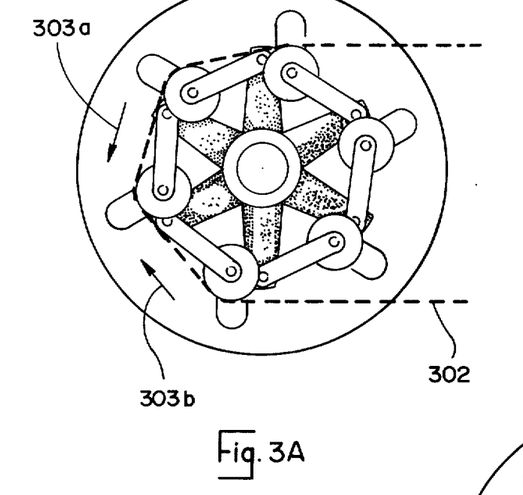
FIGS. 3A, 3B, and 3C illustrate various effective diameters of the sprocket wheel assembly in response to the torque applied.

When the transmission is at rest, i.e., there is no torque being applied, bias spring 390 keeps the sprocket wheel assemblies 341 in the farthest most ends 356 of the channels from the center. As torque is applied in the direction of rotation shown by arrow 380, the star wheel assembly moves in relative rotation to the outer plates as indicated by the arrow 394 until at the maximum angular displacement the sprocket wheels are substantially in the position as shown in FIG. 3A. Assuming that in the position as shown, the bias tension of spring 390 has been completely overcome and the sprocket wheels are positioned in their minimum effective diameter. As the load lightens bias spring 390 will cause the star wheel assembly 365 to rotate in the direction indicated by arrow 396 relative to the outer discs 310 and 320. This relative rotation causes the sprocket wheel assemblies to move in the direction indicated by arrow 329 within the channels of the outer discs 310 and 320. Note that the chain 302 will be caused to move in the direction indicated by arrow 303b in response to the torque applied, as shown in FIG. 3A. The sprocket wheel assemblies 341 that have the roller clutch bearings only rotate in the direction shown by arrow 306 and will not rotate in the opposite direction, i.e., the direction shown by arrow 305.

Note that for the rear transmission assembly such as transmission 120 shown in FIG. 1, the bias tension would be provided in the opposite direction to that described above. For that assembly under no applied load the bias tension would maintain the sprocket wheels in their smallest effective diameter, i.e., in the closest position to the center. Applied torque causes the sprocket wheels to move along the channels, e.g., channels 315 and 316, as increased torque is applied until they reach the outermost channel position 356 and correspondingly are at the maximum effective diameter.

Figure 3B:
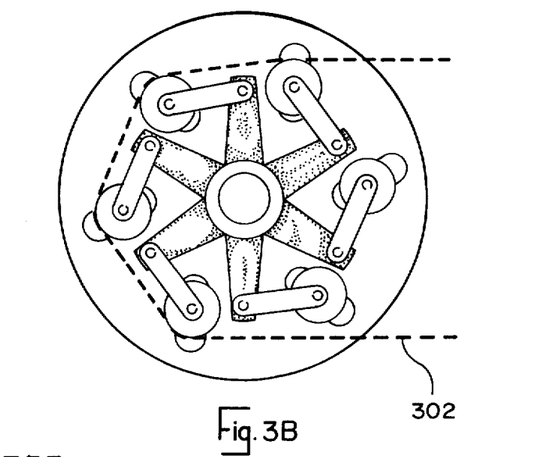
Figure 3C:
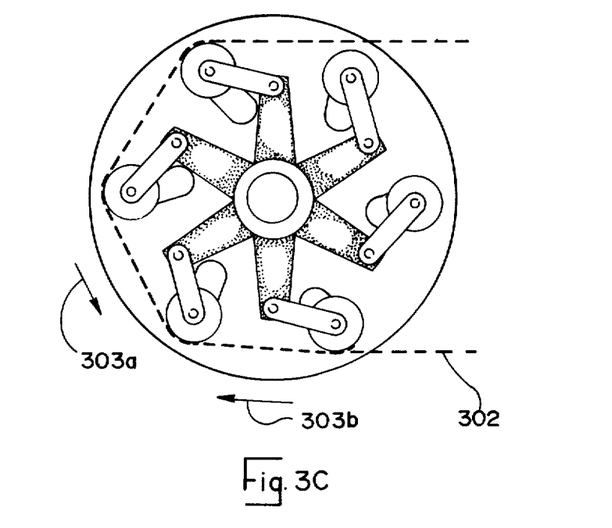
Figure 4:
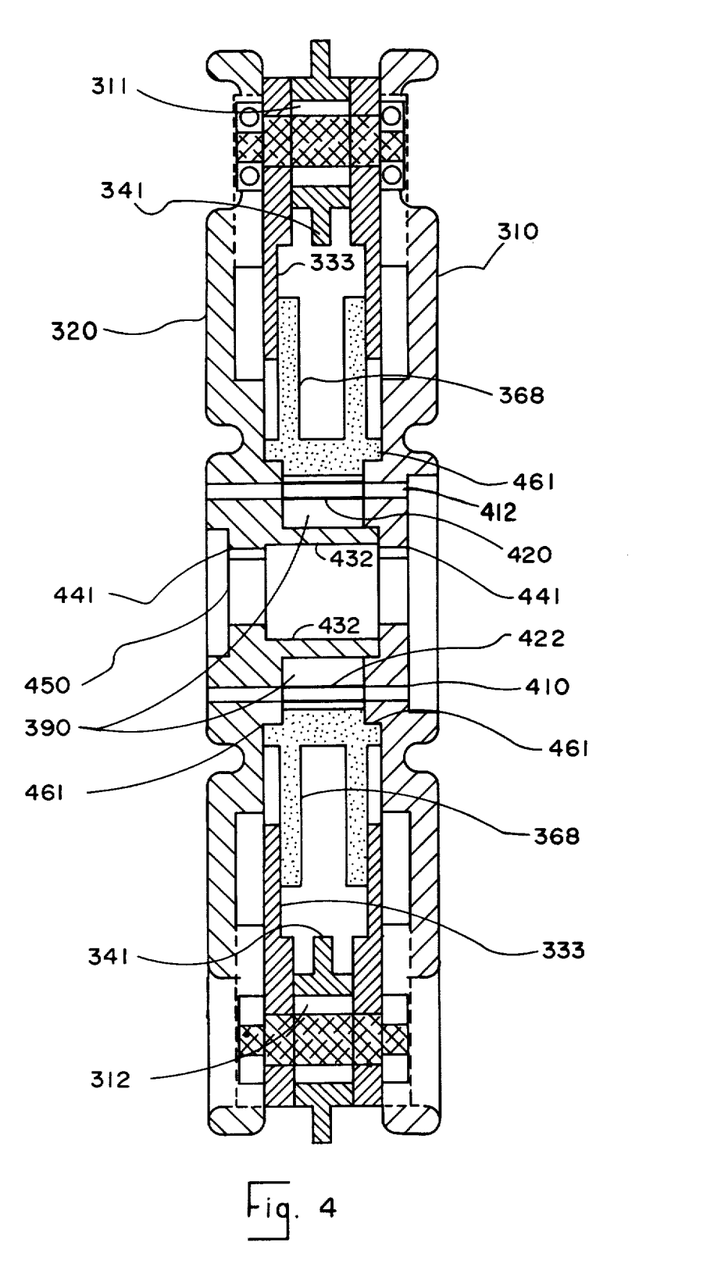
FIG. 4 is a cross-sectional side view of the first embodiment of the present invention.
Figure 5A:
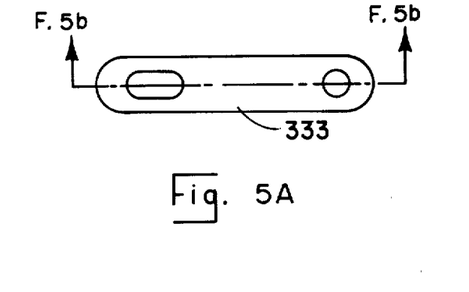
FIG. 5A is a top view and FIG. 5B is a cross-sectional side view of the sprocket wheel arm used in the first embodiment of the present invention.
Figure 5B:
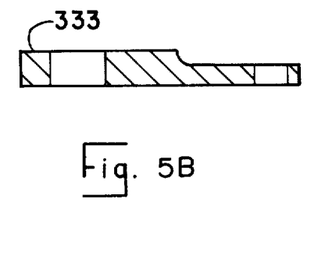
Figure 6A:
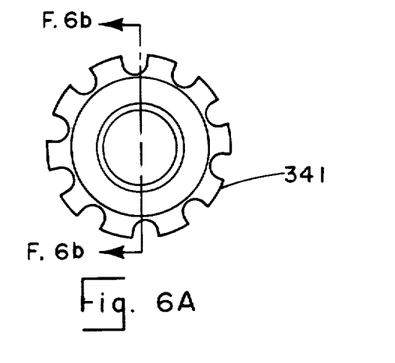
FIG. 6A is a top view and FIG. 6B is a side-sectional view of the sprocket wheel assembly of the first embodiment of the present invention.
Figure 6B:
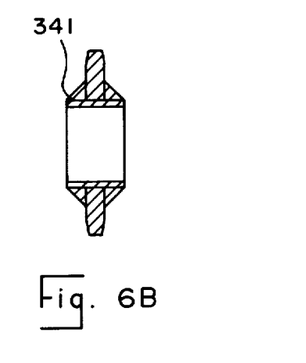
Figure 7A:
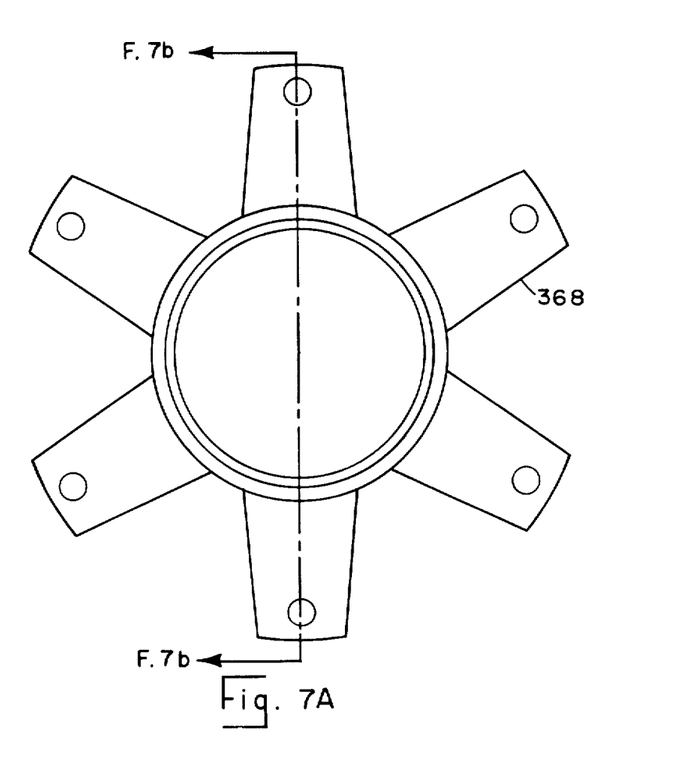
FIG. 7A is a top view and FIG. 7B is a side-sectional view of the star wheel assembly of the first embodiment of the present invention.
Figure 7B:
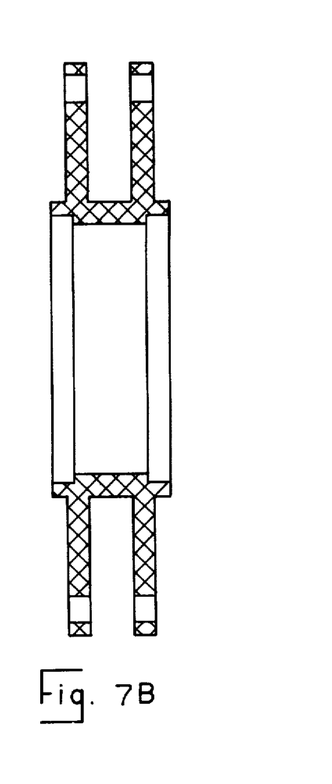

Referring now to FIG. 4, there is shown a side view of the assembly of FIG. 3C, showing the sprocket wheels in their furthermost extended position.

Inner and outer plates 310 and 320 are held together by set screws or pins 410 and 412. Spacers 420 and 422 and outer disc projections 432 ensure that the inner and outer discs are maintained at the proper distance from each other.

Spring 390 may have one end attached to disc 310 and one end attached to the star wheel assembly which carries projections 368. Attachment to disc 310 can be achieved by wrapping one end of the spring around pin 410.

The central bearing assembly 450 comprises a solid structure when the transmission is coupled to the driving source such as the crank of a bicycle, but would comprise a roller clutch assembly to allow disengagement therebetween or to allow free wheeling of the assembly to allow a neutral gear or to allow coasting when to the rear wheels of a bicycle or the like. Keys or splines 441 are provided to prevent relative rotation of bearing assembly 450 and plates 310 and 320. Roller clutches or bearings are used in positions 311 and 312 depending upon whether the sprocket wheel will be load bearing and turn only in one direction, or be "free-wheeling" as is required by those sprocket wheels used to take up the slack of the chain during quick changes in the effective diameter of the sprocket wheel assembly.

Bearing areas 461 are provided to ensure that star wheel assembly 368 slips by the mating surface with plates 320 and 310 in response to changes in the applied torque. Various techniques can be used. For one, a nylon or other low friction material insert can be used. Alternatively, dissimilar materials can be used and the mating surfaces can be polished. The surface could be anodized and the other left plain if the mating assemblies were both made of aluminum.

Figure 8A:
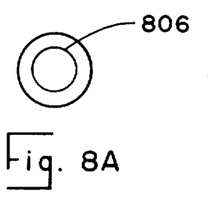
FIG. 8A is a top view and FIG. 8B is a side view of a bushing used in the first embodiment of the present invention.
Figure 8B:
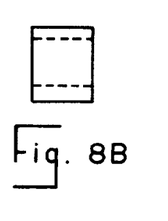
Figure 9A:
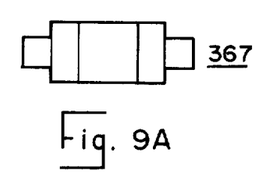
FIG. 9A is a top view and FIG. 9B is a side view and FIG. 9C is an end view of the sprocket axle used in the preferred embodiment.
Figure 9B:
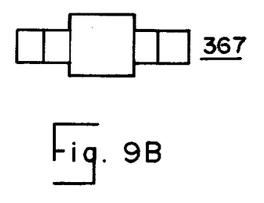
Figure 9C:
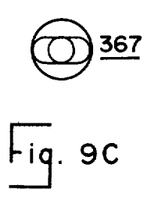

Various detail drawings of shifting arm 333, sprocket wheel 341, and star wheel 365, are provided in FIGS. 5A and 5B, FIGS. 6A and 6B, and FIGS. 7A and 7B, respectively. FIG. 8A and 8B, show details of bushing 806 while FIGS. 9A, 9B, and 9C are a top, side, and end view respectively of the sprocket axle 367 used in the preferred embodiment.

When the sprocket wheel 341 is used in the alternate idler sprocket assemblies, they may be made entirely of nylon, Teflon or some other low friction material, since they are not load bearing and it is desired to minimize and additional drag which might be contributed by them and hence reduce the efficiency of the transmission. In applications where metallic floater sprocket wheels are utilized, a bearing assembly bushing 806 such as shown in FIG. 9 of a dissimilar metallic material should be used.

FIGS. 3A, 3B, and 3C show the sprocket wheel assembly in its smallest, middle and largest effective diameter, respectively. These figures show the relative positions of either type of transmission described above.

For the transmission embodiment which is biased at its smallest effective diameter, FIG. 3A illustrates the at rest or no load position. Chain travel direction under load for this transmission would be as shown by arrow 303A. As the applied torque increased, the effective diameter would increase until the positions shown in FIG. 3B was reached. Ultimately, upon further torque being applied, the maximum effective diameter of FIG. 3C would be reached and further applied torque would not cause any further change.

In the type of transmission biased at its maximum effective diameter, typically the transmission attached to the driven member, the no load or at rest position is as shown in FIG. 3C. As torque is applied and increased the effective diameter of sprocket wheel assembly would decrease to that shown in FIG. 3B under a medium torque and to that shown in FIG. 3A under any torque sufficient to overcome bias spring 390 and maintain the sprocket wheel assembly 341 in its minimum effective diameter. Chain travel would be in the direction shown by arrow 303B. The shifting range and torque necessary to reach the maximum or minimum effective diameter of the sprocket wheel are preselected for the load range anticipated by selecting an appropriate sprocket channel length and bias spring 390, respectively. Reversal of the direction of chain travel described above is accomplished by flipping over i.e., reversing the mounting of the transmission on the shaft.

Referring now to FIGS. 10, 11, 12, 13, 14A, 14B and 14C, there is shown a second embodiment of the present invention. In this embodiment the sprocket wheels are not between the two plates but rather project on the outside of an enclosed assembly. Also, the spring is not within the hub mechanism but comprise a set of rod springs 1050 mounted to sprocket hub assembly 1090. The applied torque must therefore overcome the composite resistance of all the springs.

Figures 10, 11:
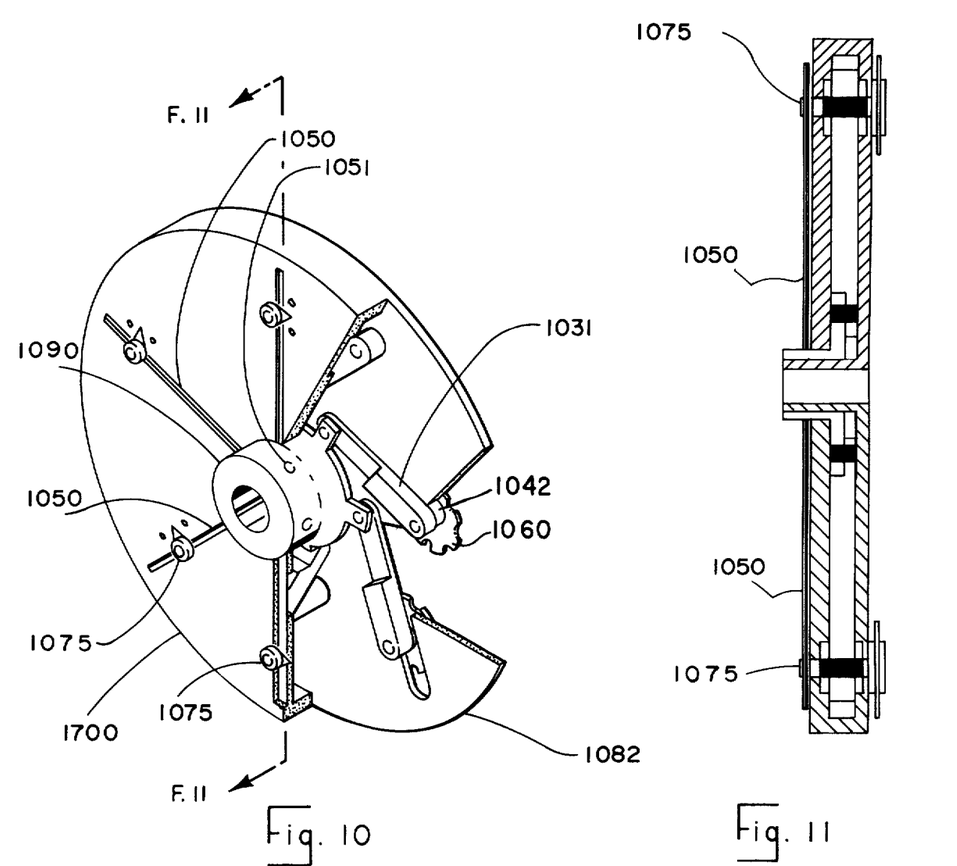
FIG. 10 is a perspective cutaway view of a second embodiment.
FIG. 11 is a side-sectional view of the embodiment shown in FIG. 10.

It should be noted that in this embodiment, the resistance of the springs is adjustable through the movement of spring adjuster 1075 to any of the positions provided by mounting holes 1078. This adjustment can be used to alter the torque range over which the shifting will occur and thus adapt the transmission to suit many different combinations of load and torque. For example, a smaller driving source, e.g., a lower horsepower engine or a weaker bike rider would achieve optimum or more enjoyable performance, respectively, when the available torque output was matched to the shifting range.

Figure 12:
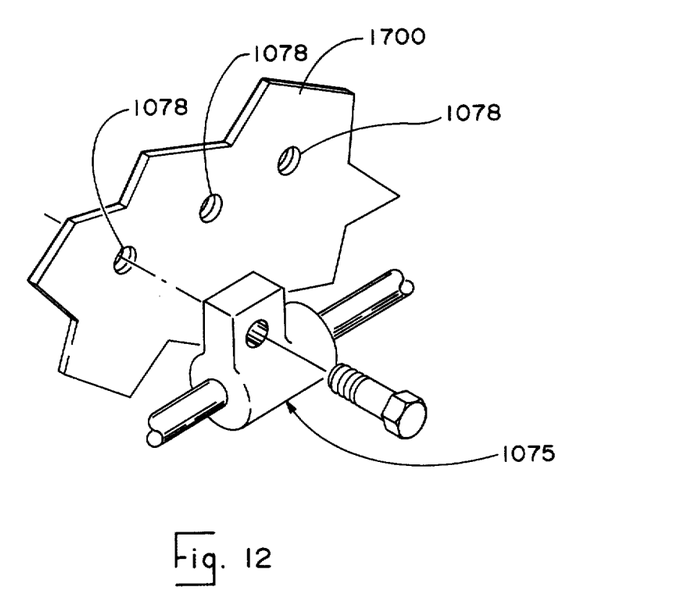
FIG. 12 is a detailed perspective drawing of the spring adjuster assembly of the second embodiment of the present invention.
Figure 13:
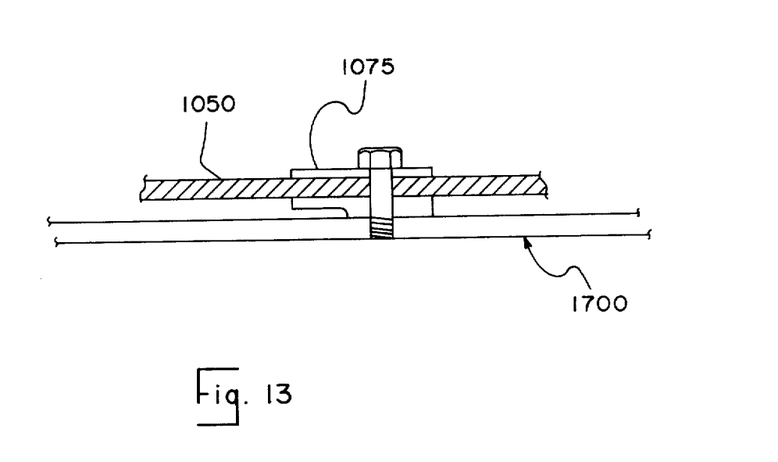
FIG. 13 is a side view of the spring adjuster assembly of the second embodiment of the present invention.
Figure 14A:
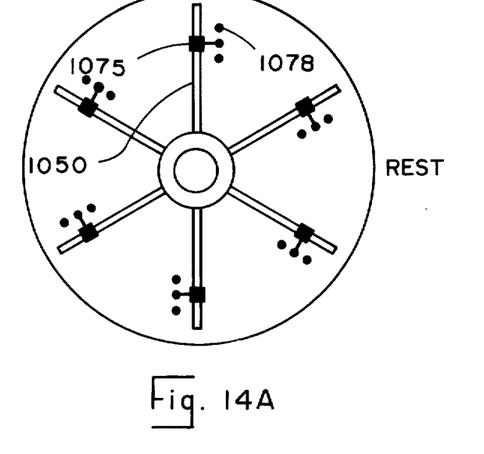
FIGS. 14A, 14B and 14C show various adjuster positions of the spring adjuster of the second embodiment of the present invention.
Figure 14B:
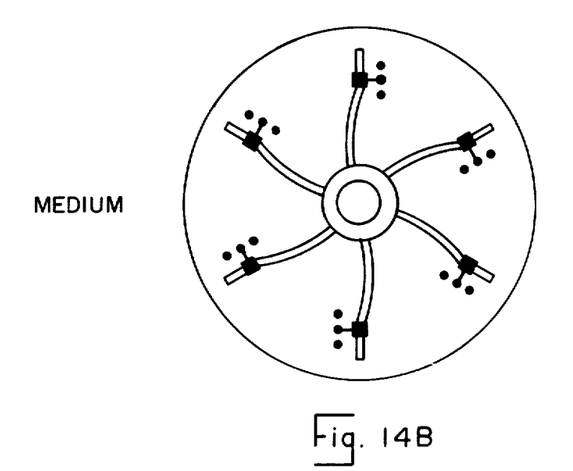
Figure 14C:
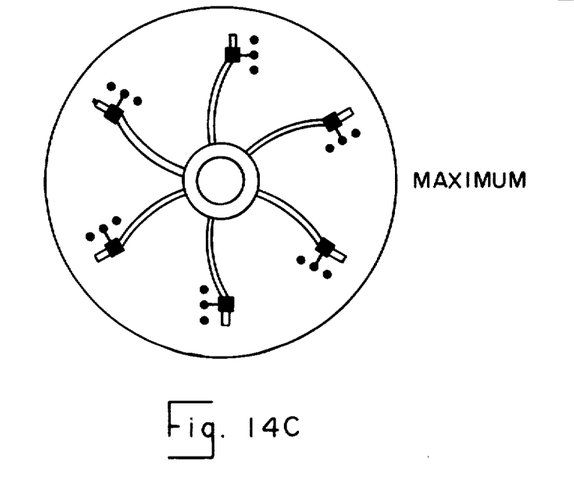
Figure 15A:
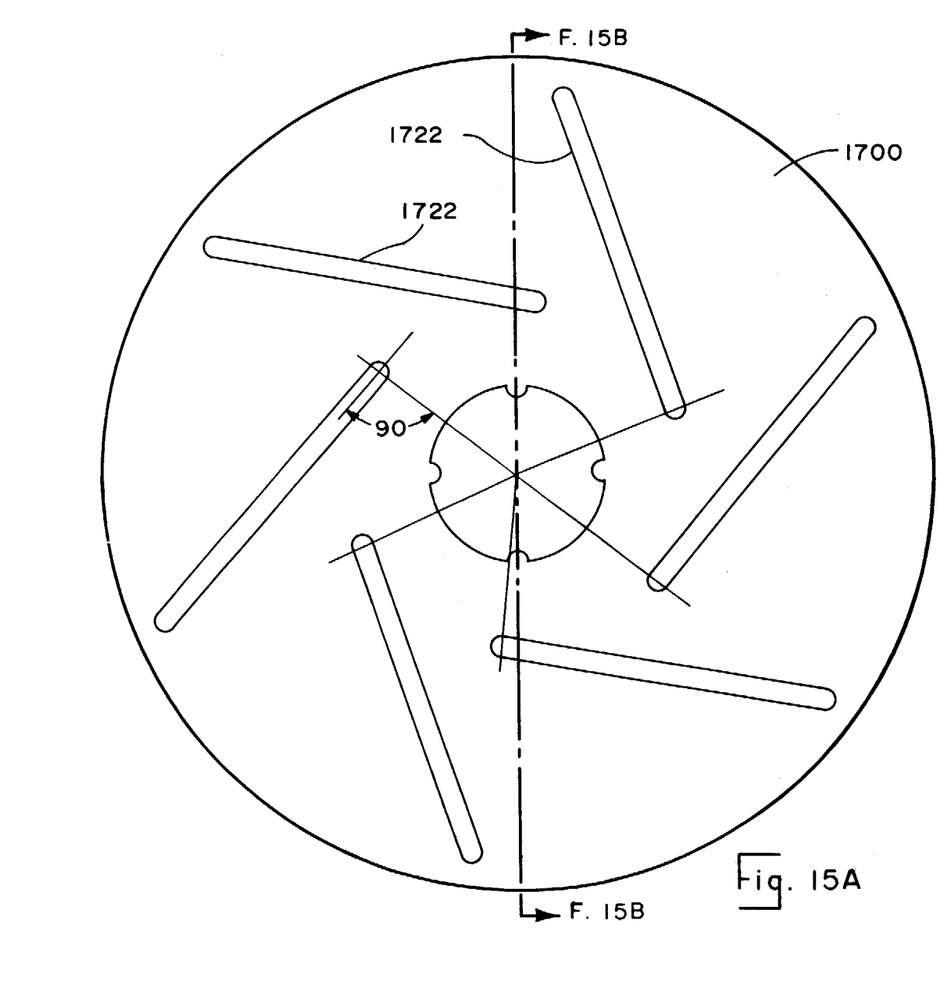
FIG. 15A is a top view and FIG. 15B is a side view of one of the opposing plates used in the third embodiment of the present invention.
Figure 15B:
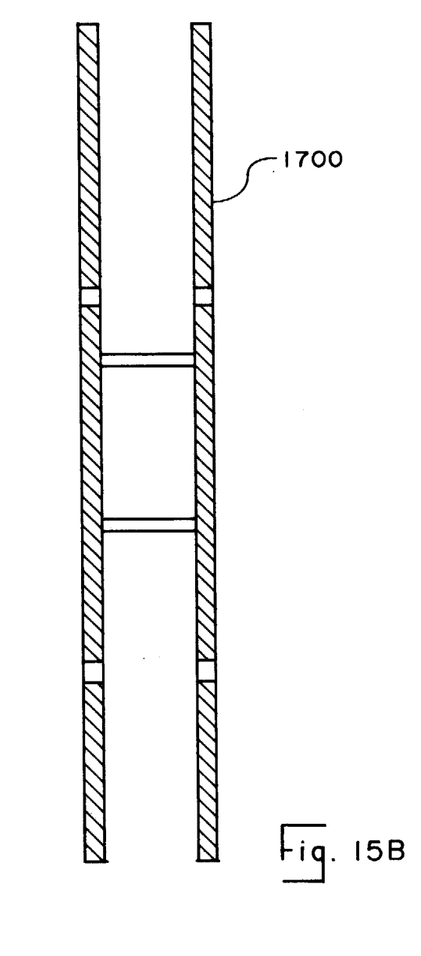
Figures 16A, 16B:
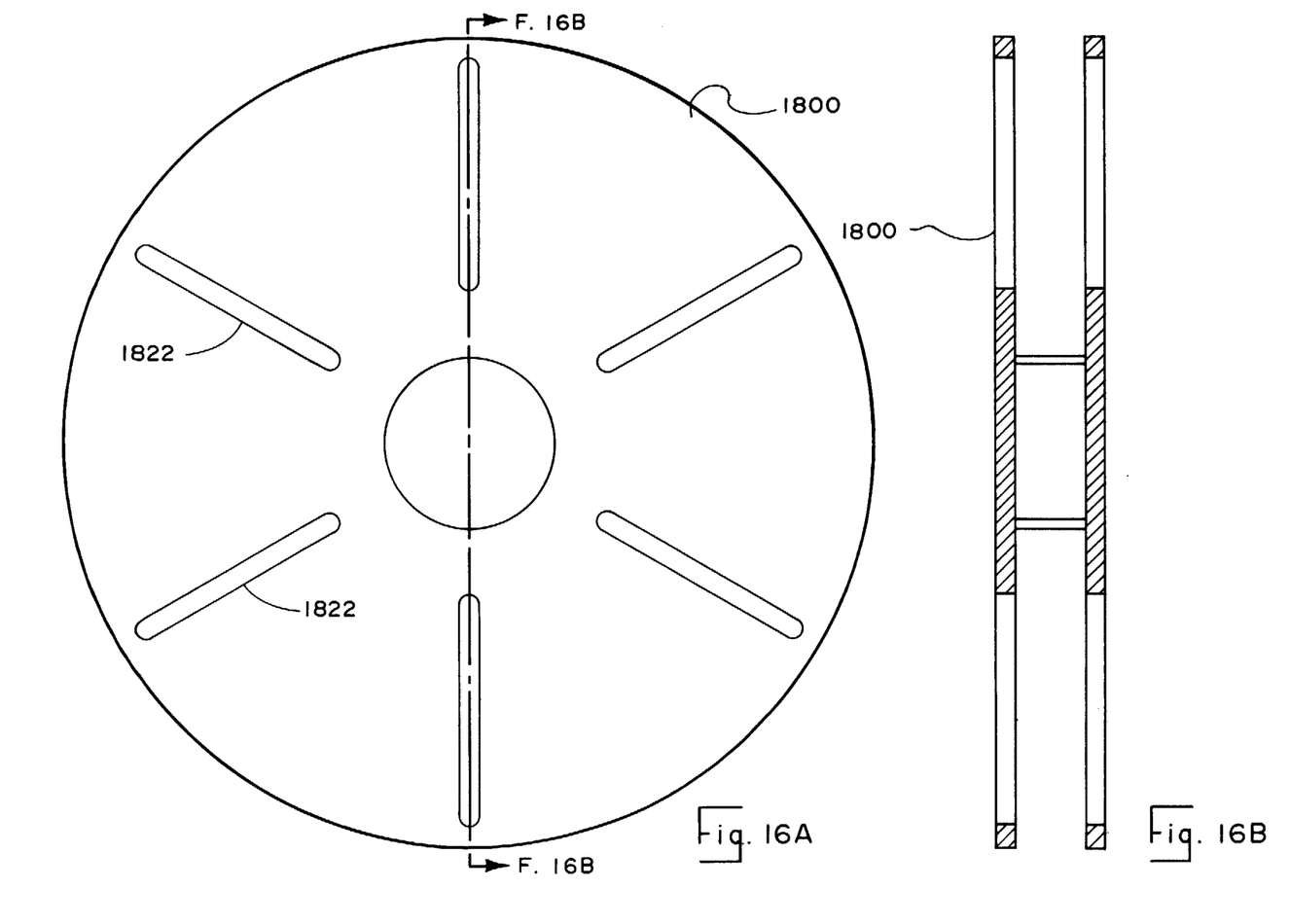
FIG. 16A is a top view and FIG. 16B is a side view of the other plate used in the third embodiment of the present invention.
Figure 17A:
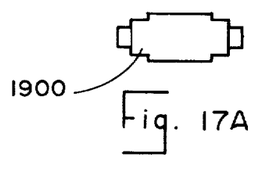
FIG. 17A is a top view and FIG. 17B is an end view of the sprocket axle used in the third embodiment of the present invention.
Figure 17B:
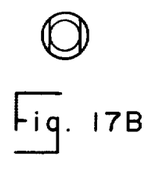

Adjustment of the torque required to move the effective diameter of the sprocket wheels over the shifting range is accomplished by moving one or more of the spring adjusters 1075 along springs 1050. Moving the spring adjuster towards the center hub increases the amount of torque required to move the sprocket wheels. Preferably all springs should be adjusted to the same position to maintain the balance of the load on the transmission parts. Springs 1050 are coupled to the hub 1090 at points 1051. Applied torque causes the relative rotation of the housing 1082 with respect to the sprocket wheel assembly comprising hub 1090, arms 1031, bearings 1042, and sprocket wheels 1060. Note that an important advantage of this embodiment is that the springs are mounted on the exterior of housing 1082 which makes possible not only adjustment but also provides easy access for inspection and replacement. The relative positions of the rod springs 1050 and adjuster assemblies 1075 to the housing slots over the shifting range is shown in FIGS. 14A, 14B and 14C. Detailed views of the housing slot and the spring clamp and adjustment assembly are shown in FIGS. 12 and 13.

Referring now to FIGS. 15A, 15B, 16A, 16B, 17A and 17B, there is shown the components of a third embodiment of the present invention. This embodiment is particularly suited to applications where a great amount of torque is present that the star wheel and arm assembly described above would not easily be made sufficiently strong to withstand the stresses imposed, for instance in a transmission for an automobile.

Figure 18:
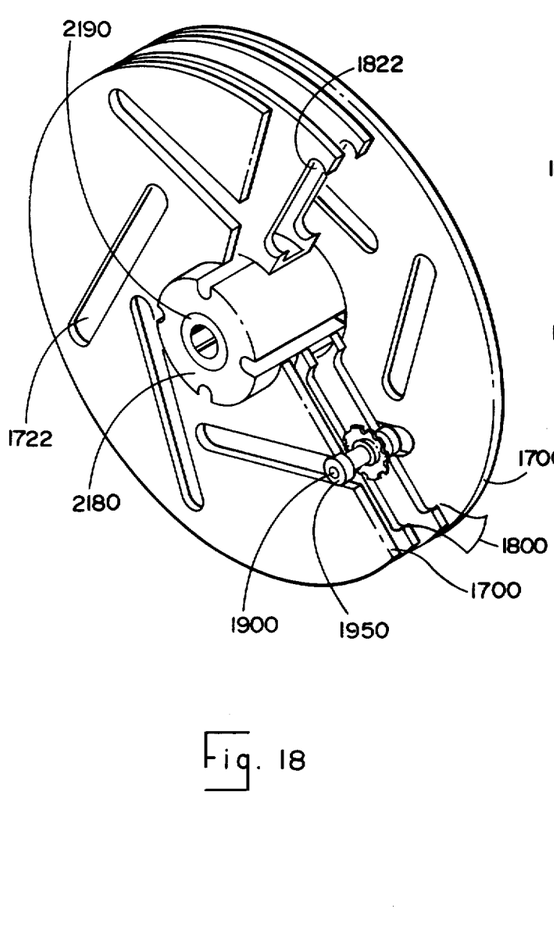
FIG. 18 is a cutaway perspective view of the third embodiment of the present invention.
Figure 19:
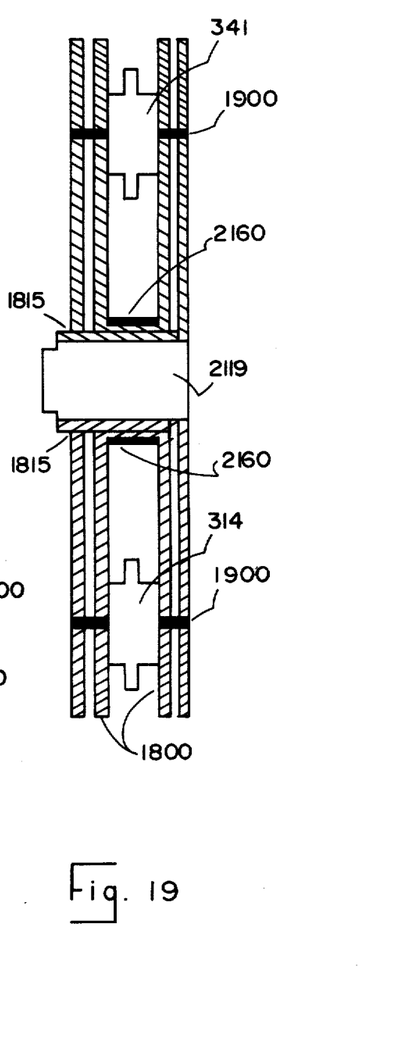
FIG. 19 is a sectional side view of the third embodiment.
Figure 20A:
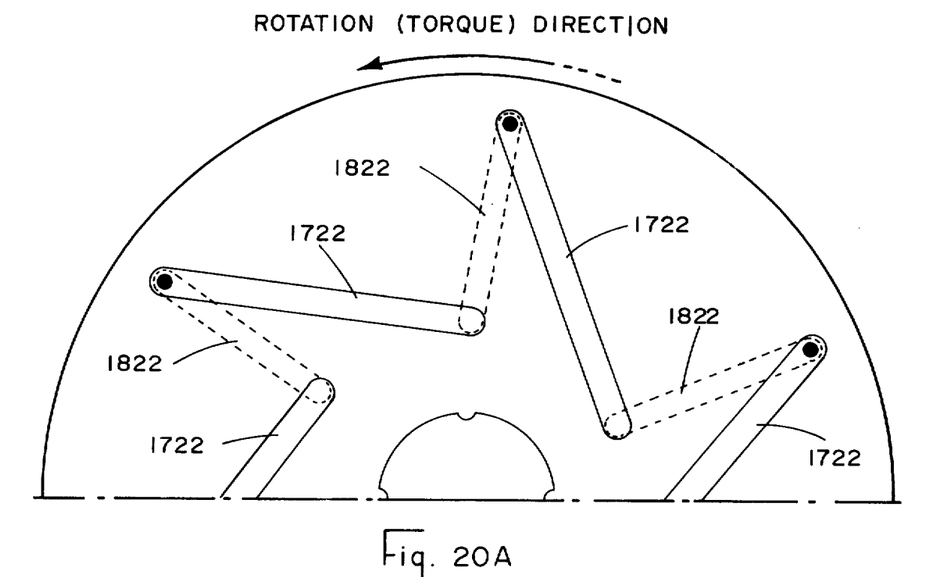
FIGS. 20A, 20B and 20C show the relative positioning of the drive plates and the sprocket wheel axle during shifting of the third embodiment.
Figure 20B:
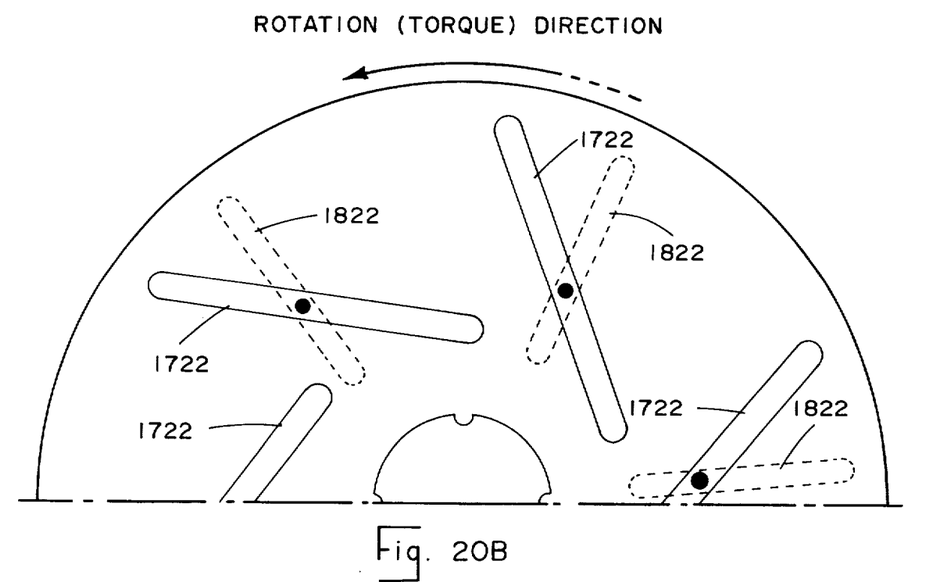
Figure 20C:
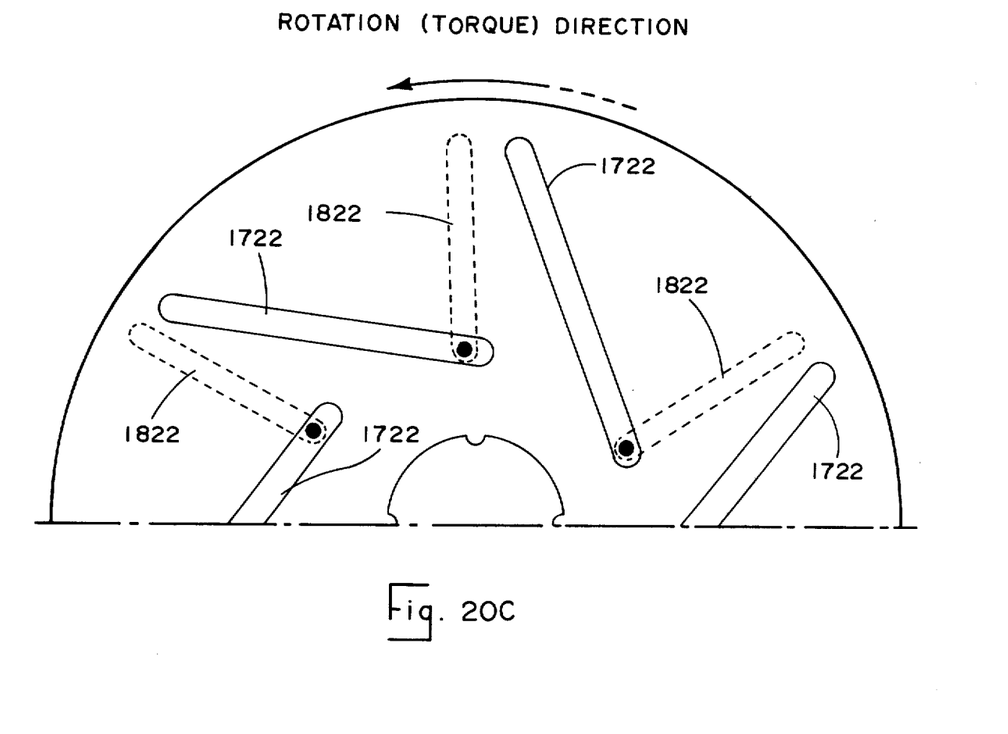

The transmission shown in this third embodiment uses two dual opposing plates 1700 and 1800 which are shown in FIGS. 15A, 15B and 16A, 16B respectively. Plates 1700 and 1800 have slots 1722 and 1822 whose paths cross-over each other when the two plates are in position. The exact point of crossover depends on the relative rotational position about the common center axis of plates 1700 and 1800. Sprocket axle 1900 rides between the plates 1700 and 1800 with each end in both a slot 1722 and an opposing slot 1822. The point of crossover of slots 1722 and 1822 is where the sprocket axle rides and as the relative position of the plate 1700 and 1800 changes, so will the crossover points and hence the position of the sprocket axle 1900. As the crossover point changes the sprocket axles 1900 and the sprocket wheels which are mounted thereon move from the most inward radial position to their most outward radial position, the effective diameter of the sprocket wheel assembly is thus varied from its smallest to its largest size. This is illustrated in the side views of FIGS. 20A, 20B, and 20C. As shown in FIGS. 18 and 19 dual double plate assemblies 1700 and 1800 move relative to each other.

As before in the other embodiments, the two plates are coupled together by a bias member which allows their relative position to be varied in response to applied torque. The spring may be placed in position 2160 or on the outside as described above with respect to the second embodiment. Welds are used in positions 1815 to complete the assembly after plate 1700 is in position. As with the embodiments above, the sprocket wheel assembly may be biased in its smallest or largest effective diameter and the torque may be applied to the sprocket wheels or to a member coupled to the plate assembly. Bearings 1950 may be provided on the ends of sprocket axles 1900, which are shown in the cutaway perspective view. The central hub area 2119 may be a solid central shaft or may be a roller clutch assembly to allow free wheeling.

I claim:

1. Automatic transmission apparatus for providing a continuously variable drive ratio comprising:

a pair of outer plates to which torque may be applied;

a sprocket support structure lying between the outer plates including a star wheel having a plurality of pairs of projections, each pair of projections carrying a pair of axle support arms;

bias means connected to the outer plates and to the sprocket structure for providing a rotational force between the outer plates and the sprocket support structure to vary the relative positions of the outer plates and the sprocket support structure in response to an applied torque; and a plurality of sprocket wheels each having an axle, each axle being supported at two spaced apart locations along the axle's length by one of the pairs of axle support arms, the sprocket wheels being regularly spaced along the circumference of a circle defined by the positions of the sprocket wheel axles, the radius of the circle being continuously varied by the relative motion of the sprocket support structure and the outer plates.

2. Automatic transmission apparatus as in claim 1 wherein the sprocket wheels are positioned on the sprocket wheel axles between the outer plates.

* * * * *